United States Patent
Zhang et al.

(10) Patent No.: US 6,961,421 B2
(45) Date of Patent: Nov. 1, 2005

(54) ECHO ANALYSIS FOR IDENTIFICATION OF HYBRID INDUCED ECHO IN A COMMUNICATION LINK

(75) Inventors: Yimin Zhang, Boyds, MD (US); Bogdan Kosanovic, Bethesda, MD (US)

(73) Assignee: Texas Instruments Incorporated, Dallas, TX (US)

( * ) Notice: Subject to any disclaimer, the term of this patent is extended or adjusted under 35 U.S.C. 154(b) by 347 days.

(21) Appl. No.: 10/171,754

(22) Filed: Jun. 17, 2002

(65) Prior Publication Data

US 2003/0231761 A1 Dec. 18, 2003

(51) Int. Cl.⁷ .............................................. H04M 9/08
(52) U.S. Cl. .......................... 379/406.01; 379/406.05; 379/406.08; 379/345
(58) Field of Search ...................... 379/406.01–406.16

(56) References Cited

U.S. PATENT DOCUMENTS

| | | | | |
|---|---|---|---|---|
| 5,434,916 A | * | 7/1995 | Hasegawa | 379/406.01 |
| 5,577,097 A | * | 11/1996 | Meek | 379/406.01 |
| 6,023,674 A | | 2/2000 | Mekuria | 704/233 |
| 6,125,179 A | | 9/2000 | Wu | 379/388 |
| 6,185,300 B1 | | 2/2001 | Romesburg | 379/410 |
| 6,198,819 B1 | * | 3/2001 | Farrell et al. | 379/406.01 |
| 2003/0053617 A1 | * | 3/2003 | Diethorn | |

* cited by examiner

*Primary Examiner*—Sinh Tran
*Assistant Examiner*—Ramnandan Singh
(74) *Attorney, Agent, or Firm*—Abdul Zindani; Wade James Brady, III; Frederick J. Telecky, Jr.

(57) ABSTRACT

Echo return loss is analyzed to determine if the near end connection of a communication link has hybrid induced echo. If the echo return loss is above a threshold value for a predetermined period, than no echo or very little echo is present. The lack of echo is treated as a four wire connection and the near end signal is processed accordingly. If the foreground and background filter update relationship indicates the presence of a hybrid or if the echo return loss drops below a second threshold, the condition of the near end signal is treated as a two wire hybrid induced echo. The analysis of the near end signal continues and treatment of the signal may switch between four wire and two wire any number of times during a communication link.

9 Claims, 6 Drawing Sheets

FIGURE 1

PRIOR ART

FIGURE 2

PRIOR ART

PRIOR ART

ECHO ANALYSIS FOR IDENTIFICATION OF HYBRID INDUCED ECHO IN A COMMUNICATION LINK

FIELD OF THE INVENTION

The invention relates to determining the type of connection present in a communication link. Specifically, the present invention relates to a method for determining if a hybrid exists in the near end of a communication connection through an assessment of echo return loss.

BACKGROUND OF THE INVENTION

Figure 1:
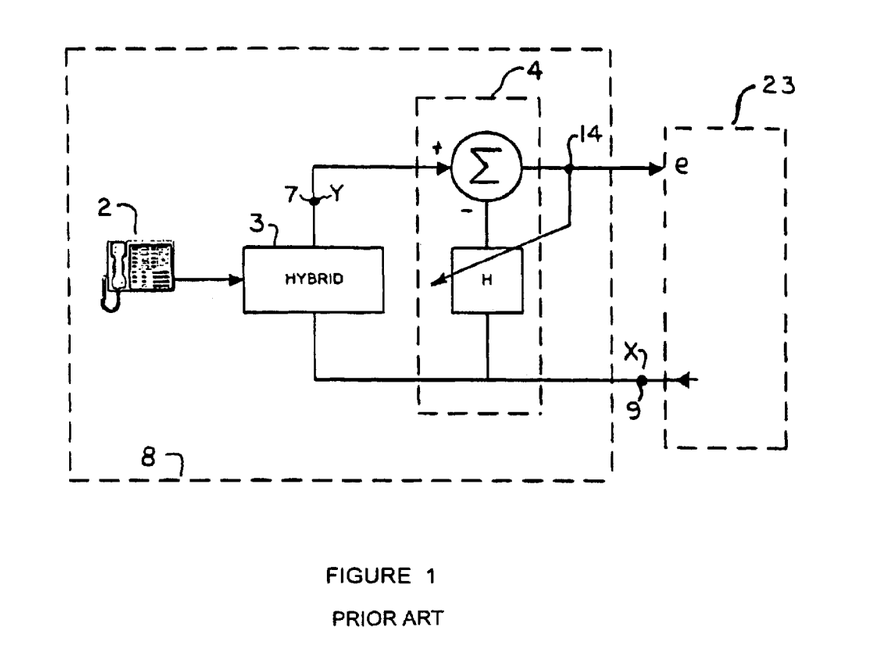
FIG. 1 is a simplified block diagram of one end of a communication link.

FIG. 1 illustrates a simplified block diagram of an equipment configuration for one terminal of a communication link which includes a near end hybrid. The communication link has a near-end 8 comprising a telephone 2, a four-to-two wire hybrid circuit 3, and an echo canceller circuit 4. A far-end connected to communication network 23, can be similarly configured but is not illustrated in FIG. 1. During a conversation between the near-end and far-end users, the far end signal, X, which contains both the far-end user's speech and incidental background noise, enters the near-end 8 as signal X at node 9.

The far-end signal is provided to the four-to-two wire hybrid circuit 3 and then to near-end telephone 2. Due to the unavoidable non-linearities present in the hybrid circuit 3, some portion of the far-end signal power is coupled onto the output 7 of the hybrid circuit 3 as an echo. A composite signal Y exists at node 7 containing the echo signal and the combined speech of the near-end user and any incidental background noise from the near-end user's environment. A filter having a filter length period selected and designed to be longer than the hybrid dispersion time is used prior to power level measurements at 7 to allow the echo canceller 4 to operate properly.

Echo canceller 4 synthesizes the expected value of the echo signal and subtracts this value from the composite signal Y existing at node 7. The resulting difference signal, e, existing at node 14, is intended to contain only the near-end signal originating from telephone 2. Ultimately, difference signal, e, is provided to the far-end telephone through the communications network 23.

Methods of measuring the echo return loss typically measure a signal at node 9, where the signal power from the far-end would normally exist. A measurement of the signal power, X, at node 9 is made. Additionally, the power level of the composite signal Y, comprised of the coupled echo signal and any signal generated by the near-end telephone 2, is measured at node 7. The measurement can be made when little-to-no signal is being generated at near end telephone 2. Assuming the signal power of any signal generated by the near-end telephone is very small in comparison to the coupled echo signal power, the ratio of the measured test signal power X to the measured power level Y provides an estimate of the echo return loss (ERL) for the near-end 8. The magnitude of echo return loss is usually measured as a difference in dB between signal X and signal Y. As described in the co-pending application Ser. No. 10/029,669, incorporated herein in its entirety by reference, echo return loss may be measured dynamically during the course of a telephone conversation.

Figure 2:
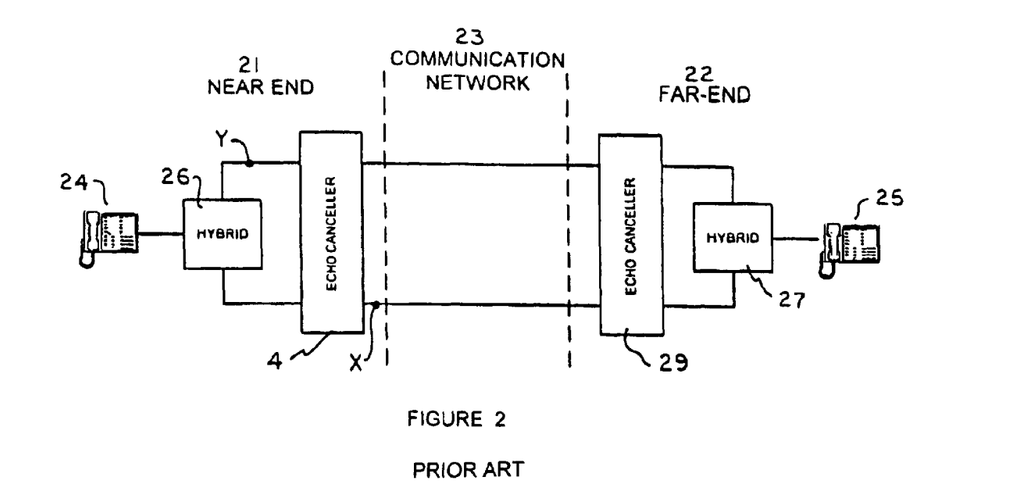
FIG. 2 is a simplified block diagram of a representative communication link between two two wire telephones each attached to the communication link via a hybrid.

Echo is an important factor in communications which include a hybrid between a four wire communication network 23 and the end terminals 24 and 25 as illustrated in FIG. 2. When echo is present, it is preferable to eliminate the echo. To eliminate the echo, the magnitude of the echo must be determined. One way of determining the magnitude of the echo is through echo return loss (ERL) estimation. A high echo return loss means that there is very little echo because most of the energy from the far end has been lost when the near end signal combined with echo is measured.

Figure 3:
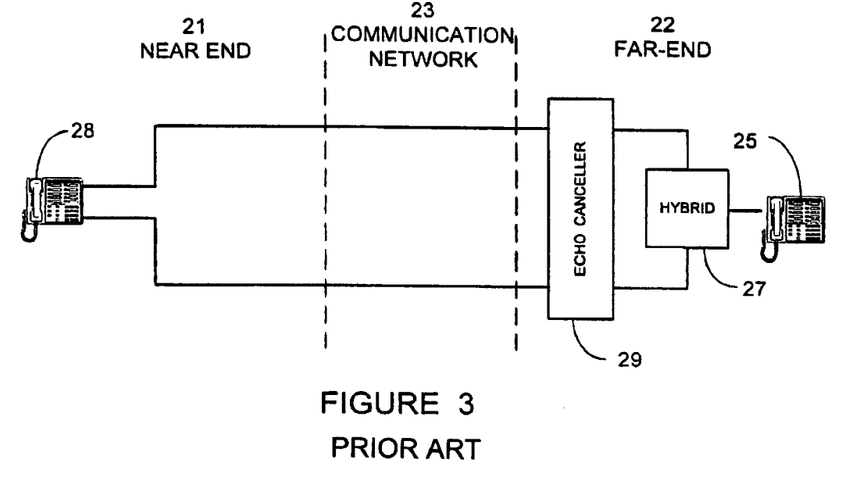
FIG. 3 is a block diagram of a communication link with a four wire terminal unit at one end.

If one or more of the terminal units 28 is a four wire unit and is connected by four wires directly to the four wire communication network 23, as illustrated in FIG. 3, then the other unit 25 will not experience hybrid induced echo. If both of the terminal units are four wire units connected as four wire units, then neither unit will experience hybrid induced echo. If no echo is present, no echo cancellation is needed.

SUMMARY OF THE INVENTION

Figure 4:
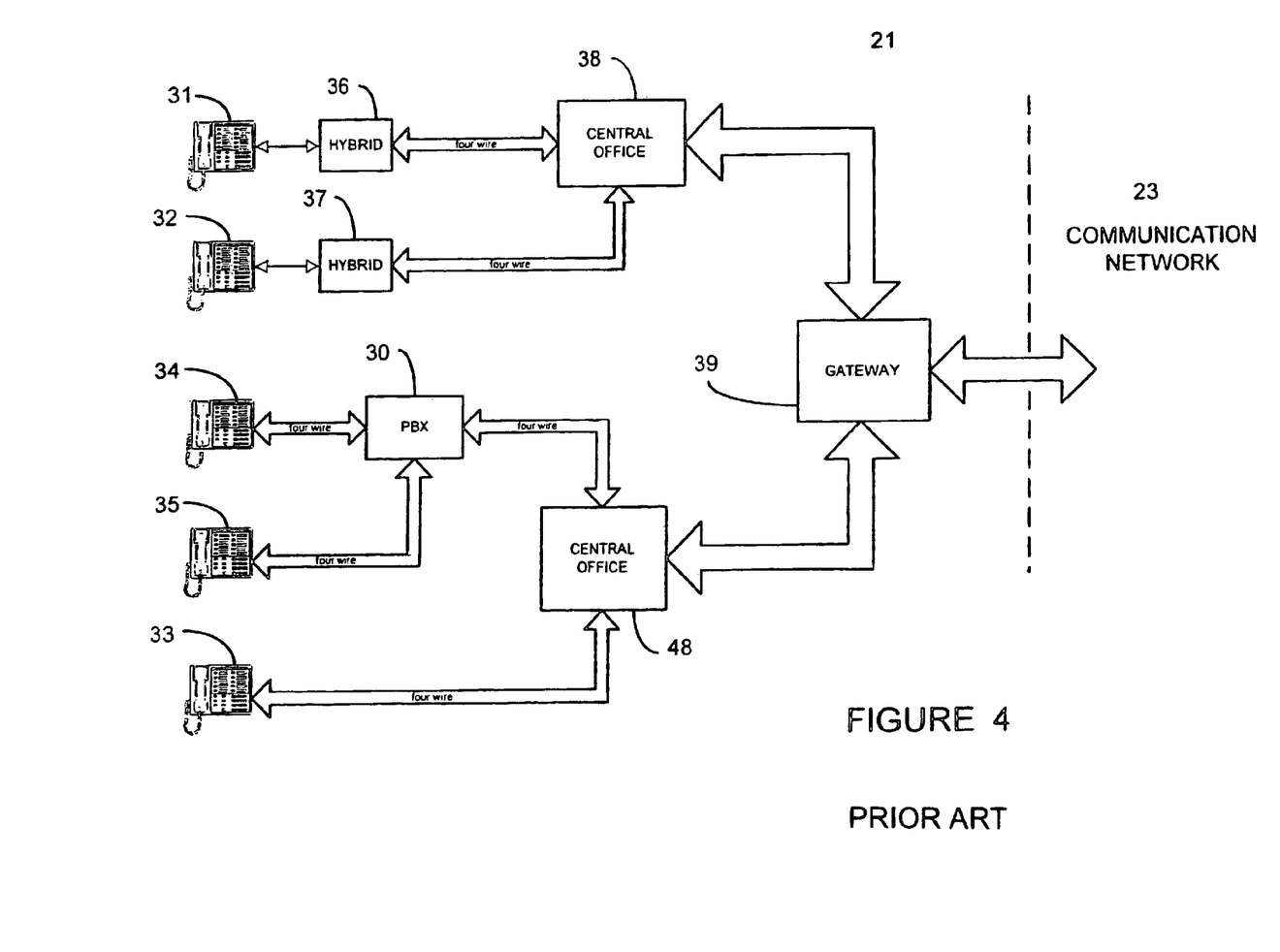
FIG. 4 is a block diagram of one end of a communication system illustrating two wire and four wire terminal units connected through separate central offices to a gateway on one side of a communication network.

In a typical communication system, as illustrated in FIG. 4, there are a number of terminal units 31, 32, 33, 34 and 35 which can be individually connected to the near end 21 of a communication system. Some of the terminal units 31 and 32 are two wire telephones which are connected through hybrids 36 and 37 and through central office 38 to gateway 39. Some of the terminal units 34 and 35 are four wire units connected through a PBX 30 and through a central office 48 to gateway 39 without any hybrid. Terminal unit 33 is connected directly through central office 48 to gateway 39 without hybrids.

When the gateway is processing a communication link between one of the terminal units 31–35 and the communication network 23, the echo cancellation as well as other signal processing functions resident in the gateway can treat the terminal unit of a current communication link as a two wire unit with a hybrid or as a four wire unit. The present invention provides a determination for the gateway so that the signal can be most efficiently and most effectively processed. In order to make this determination, the present invention evaluates the near end echo based on echo return loss estimation and classifies the near end terminal unit as two or four wire based upon the far end signal and it echo or lack of echo in the near end signal.

The present invention teaches the analysis of near end echo return loss to evaluate the proper echo treatment for appropriate application to the near end signal processing. The absence of significant echo, within certain parameters, is an indication that the near end connection does not include a hybrid which is a strong indication that the near end terminal unit is a four wire or digital telephone 33, 34, 35 connection and not a two wire or analog telephone 31, 32 connection. Identification of a four wire connection, or a connection which should be at least temporarily treated as a four wire connection, at the near end of a communication connection is important for proper signal processing.

The detection of a four wire type connection at the near end, can provide the information necessary to determine the need to generate an echo cancellation signal to cancel hybrid echo at the near end. By eliminating the need to cancel echo, a savings in processing resources can be realized. The present invention measures the echo return loss dynamically during the course of a telephone conversation or some other form of telephony communication. The present invention monitors the level and variation of the echo return loss over the course of the communication. When the ERL estimate measured at the near end is above a threshold for a sufficient period of time or for a sufficient number of consecutive measurements, the present invention will determine the presence of a four wire type connection (lack of a hybrid echo) at the near end. The system can then handle echo cancellation as in a four wire environment, for example by eliminating the use of background and foreground filter updates and checks for convergence.

Without a recognition of a four wire connection, the echo cancellation in the gateway will continue to attempt to cancel echo and will therefore will continue to attempt to obtain filter coefficients and filter updates. The filter settings will be based upon extremely weak perceived echo. Although the filter coefficients for a four-wire/no-significant-echo condition should ideally be zero, the filter coefficients will remain at some non-zero value and the echo canceller will actually generate false echo. Situations with no echo or almost no echo are most effectively and efficiently treated as four wire connections.

In one exemplary embodiment for estimating the ERL, the estimation of the echo return loss of a communication link includes: measuring a peak power value of a signal received from a far end of a communication link, within a period; measuring a peak power value of a signal received from a near end of the communication link, within a near-end delay line coordinated with the period; and calculating the echo return loss estimate, for the period, as a ratio of the far-end peak power value to the near-end peak power value. The measured far-end signal is the payload information that the communication link was established to convey and the measured near-end signal has coupled echo signal power from the far-end signal. Any defined period will do to allow for periodic updating of the ERL estimate so long as a corresponding period for the echo measurement is available.

One method can estimate ERL every time a far-end peak power is detected, using any peak detection method. Alternative methods can estimate ERL on a scheduled periodic basis or based upon the occurrence of other signal attributes or characteristics. The estimated value is passed to a higher level state machine where the estimates are processed to establish a refined running estimate of the ERL. The determination of a four wire connection, or lack of hybrid, is, in the preferred exemplary embodiment, made based upon the periodic estimates. In an alternative embodiment, the determination of a four wire connection can be based upon the changes to and/or the refined running estimate of ERL.

The echo return loss for the $i^{th}$ period may be estimated by the equation:

$$erl_i = 10*\log_{10}(P_{Xi}) - 10*\log_{10}(E_{Xi})$$

where, $erl_i$ is the echo return loss for the $i^{th}$ period, expressed in decibels, and $P_{Xi}$ and $E_{Xi}$ are the measured powers for the far-end signal and corresponding echo signal, respectively, assuming the near-end speech and background noise are negligible and where $P_{Xi}$ and $E_{Xi}$ have the same resolution, preferably 5 ms root mean square-based power.

It may happen that, at the time of the estimate, there is near-end speech or non-stationary noise combined with the echo signal. In this case, the estimated ERL can be much lower than the actual ERL. This effect can be dealt with by a state machine as described in co-pending application Ser. No. 10/029,669.

An ERL estimate above a certain threshold, eg 40 dB in the exemplary embodiment, indicates that there is almost no echo or that there is a complete lack of echo. This condition can occur when the near end echo canceller very closely matches the signal from the far end or when there is no signal to echo from the far end or when the terminal equipment at the near end is not using a hybrid and thus generates no echo of the far end signal. In any of these cases, no echo cancellation is necessary.

BRIEF DESCRIPTION OF THE DRAWINGS

Preferred embodiments of the invention are discussed hereinafter in reference to the drawings, in which.

DETAILED DESCRIPTION OF THE INVENTION

FIG. 2 illustrates a representative communication link 20 between two telephones 24 and 25. The link is comprised of a near-end 21, a far-end 22, and a communication network 23 that interconnects the near-end 21 and far-end 22. The near-end 21 has a user telephone 24, a hybrid circuit 26, and an echo canceller circuit 28. Similarly, the far-end 22 has a user telephone 25, a hybrid circuit 27, and an echo canceller circuit 29. Far-end signal power, X, is received by the near-end. Signal Y is the coupled echo signal from the far-end signal as well as the near-end signal produced by telephone 24. This near-end signal contains both the speech of the near-end telephone user and the background noise of the user's environment. Together, the near-end signal and far-end echo signal are represented by Y.

Figure 5:
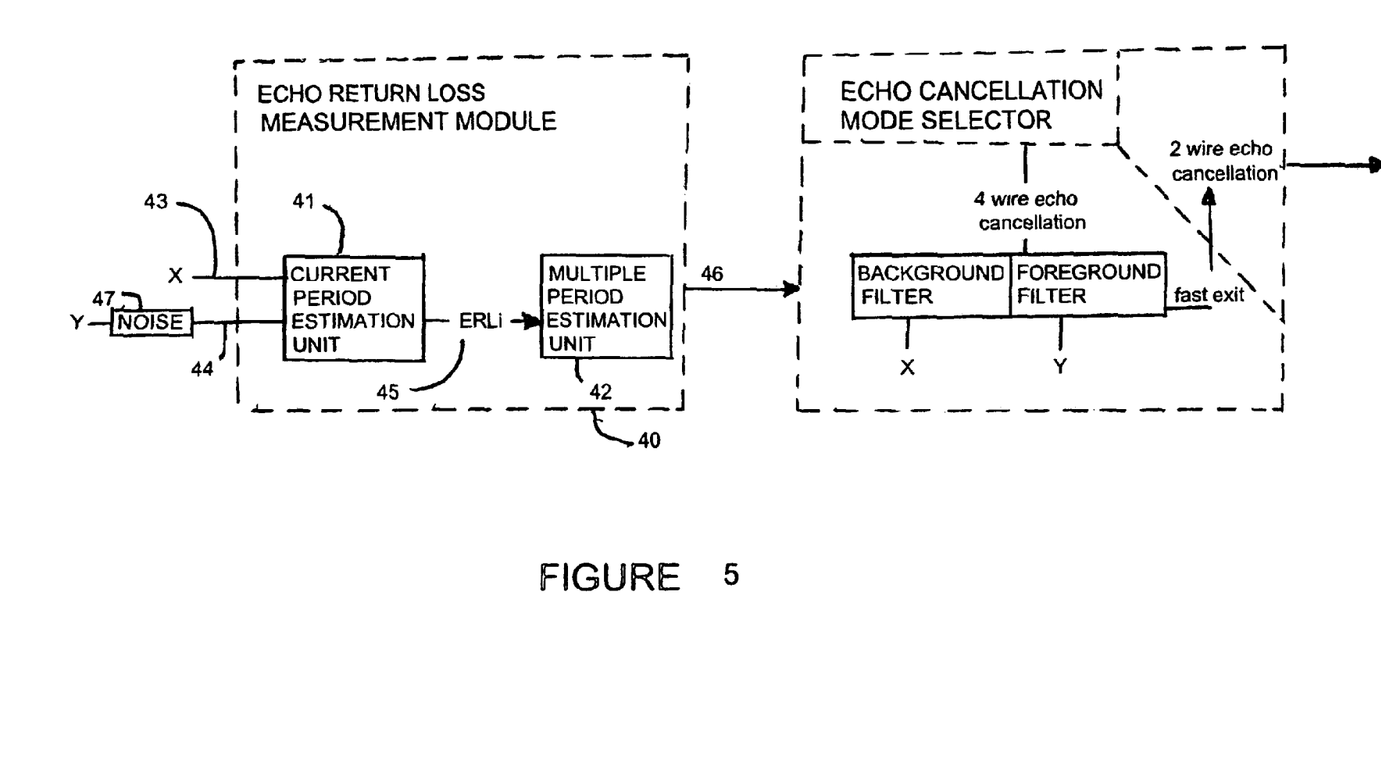
FIG. 5 illustrates an echo return loss measurement module having a current period estimation unit and a multiple period estimation unit.

FIG. 5 illustrates an echo return loss measurement module 40 having a current period estimation unit 41 and a multiple period estimation unit 42. Current period estimation unit 41 measures the far-end power X, presented on line 43, and the combined far-end echo signal and near-end signal Y presented on line 44. A noise cancellation circuit 47 estimates the near-end noise within the near-end signal Y, then synthesizes the estimated near end noise and subtracts the synthesized near-end noise from the near-end signal Y to eliminate as much of the noise as possible.

Figure 6:
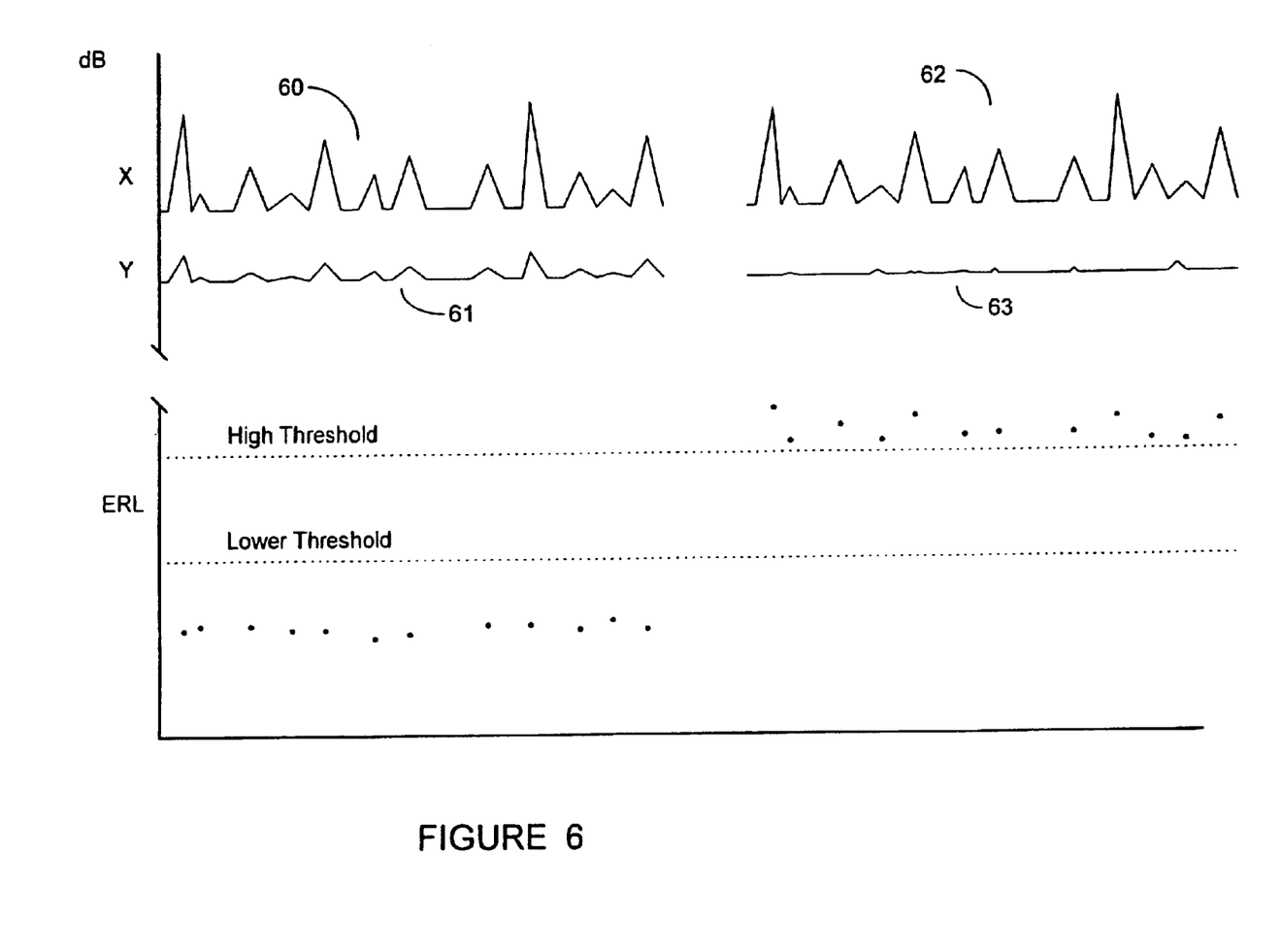
FIG. 6 illustrates the time-varying power of an exemplary far-end signal, its echo and the resultant ERL.

FIG. 6 illustrates the time-varying power of an exemplary far-end signal X measured by the current period estimation unit 41. FIG. 6 also illustrates the corresponding echo signal Y. Values of the far-end signal power X and its echo Y are measured at periodic times. The values of X and the corresponding echo values Y are collected and compared to determine a corresponding ERL estimate, also illustrated in FIG. 6, corresponding to each power measurement pair X, Y. The power measurement X provides the value of the far end signal and the value Y is the power of the echo. These power measurements are used to calculate the echo return loss estimate also illustrated in FIG. 6.

As stated previously, successive periods can occur at definite or at indefinite times. In other words, the measurements of signal power X and echo power Y do not necessarily occur regularly. The initiation of a period can occur when a peak is detected in the far-end power signal X, as illustrated in the exemplary embodiment. Alternatively, the measurement can be acquired after a certain time interval or upon the occurrence of another characteristic of the far end signal or the echo signal.

Once the peak power value for the far-end signal X has been identified and measured, the current period estimation unit 41 attempts to identify the corresponding echo power peak, on signal line 44, that corresponds to the far-end signal peak. FIG. 5 illustrates the echo signal Y corresponding to the far-end signal X. Due to delay, the echo signal Y may be offset in time from the far-end signal X. In FIG. 6 the signals X and Y and the corresponding ERL are illustrated as aligned, even though they may be offset in time. Assuming that the hybrid circuit is linear and the near-end background noise and speech power are negligible, the echo signal peaks Y will correspond proportionately to the far-end signal peaks X that created it.

After each echo return loss value is calculated, the current period estimation unit 41 provides the value to the multiple period estimation unit 42 on line 45, as illustrated in FIG. 5. This latter estimation unit 42 makes a determination of whether to update a refined estimate of the echo return loss using the value of $erl_i$ for the most recent filter length period, the current period. This determination is based upon the current state of the multiple period estimation unit 42 state machine.

The value of the refined running estimate is also initialized at the onset of the communication link and is preferably set to a value of 6 dB, since the International Telecommunication Union ITU-T Recommendation G.168, Digital Network Echo Cancellers (hereby incorporated into the specification by reference), requires a minimum echo return loss of 6 dB. As each echo return loss value is calculated for the current period, the multiple period estimation unit 42 compares the running ERL estimate to the current estimate and determines if the running average ERL estimate should be modified or updated. As the value of $P_{Yi}$ becomes increasingly greater with respect to $P_{Xi}$, the value of $erl_i$ becomes increasingly smaller.

When near-end speech or high-power background noise occurs at the same time as the echo signal of interest, the utility of the echo return loss measurement for the current period is discounted. It is discounted by refraining from updating the refined estimate of the echo return loss when this situation is suspected. If a subsequent measurement of the echo return loss, occurring within the wait period, has a value conforming to the constraint of condition Z, then the echo return loss deviation is deemed to be short term and likely caused by double-talk or near-end high-power background noise. Double-talk occurs when the far-end user and near-end user speak at the same time.

A deviation between the measured echo return loss for the current period and the value expected may also occur due to real changes of the echo return loss. Such real changes are generally more long term in their effect. Base upon experimental results, a wait period of about 750 ms provides a good indication of whether the deviation of the measured echo return loss is a short-term or long-term effect. During the running of the wait timer, no updates are made to the refined estimate of the echo return loss. If the deviation is short-term, the current value of the refined echo return loss estimate still provides an accurate gauge of the actual echo return loss.

If the wait period expires without an intervening transition, the deviation of the current estimate from the refined estimate of the echo return loss indicates that the refined echo return loss estimate may no longer provide an accurate measure of the actual echo return loss. Once the ERL Change Confirmed state becomes active, it remains active for the period that the current echo return loss estimate remains substantially less (e.g., 9 dB less) than the refined estimate of the echo return loss. During this period, the refined estimate is updated after each measurement of the echo return loss and converges toward the expected value of the echo return loss. A return to the ERL Stable state occurs when the measured echo return loss is equal to or greater than the refined estimate less 9 dB.

When there is negligible near-end speech or background noise to combine with the echo signal, the measured power of $P_{Yi}$ more accurately reflects the power of the echo signal alone. This is because the speech or noise power does not significantly change the measured power when additively combined with the power of the echo signal. When the near-end speech or noise power is relatively significant with respect to the echo signal, the combined signal power includes the additive contributions of both signals and the measured power is greater than the actual power of the echo signal. This condition would produce an inaccurate under estimate of echo return loss. Though it is possible that the near-end speech or background noise could negatively combine with the echo signal to reduce the combined power of the signals, this situation is very unlikely.

In determining the classification of a near end signal as containing far end echo for the purposes of processing the signal as two wire or four wire, each ERL is considered and compared to a high threshold and a low threshold. FIG. 6 illustrates a first far end signal 60 and its corresponding near end 61 and a second far end signal 62 and its corresponding near end 63. As illustrated, if an echo is present, as in the signal 61 illustrated in FIG. 6, the echo will closely parallel the far end signal but will be proportionately smaller. The power values of the echo peaks in echo 61 are less than but have profiles corresponding to the signal peaks of signal 60. The difference between the two signals 60 and 61 is measured as the echo return loss illustrated below the two signals. Because the shape of the echo signal 61 corresponds to the far end signal 60, the ERL is fairly constant. The magnitude of the loss remains below the lower threshold and therefore the signal 61 is classified as echo.

The second pair of signals 62 and 63 illustrated in FIG. 6 do not demonstrate the same correspondence. Signal 63 is typical of the lack of an echo of the far end signal 62. Because the signal 63 is not an echo of signal 62, it does not have the same profile and therefore the difference between the two signals will have greater variance, as illustrated. Because the near end signal 63 does not include any of the far end signal 62 as an echo, the ERL will be larger than the ERL high threshold. If the ERL remains above the high threshold for more than a required number of measurements, then the signal 63 will be treated as a signal without echo.

Figure 7:
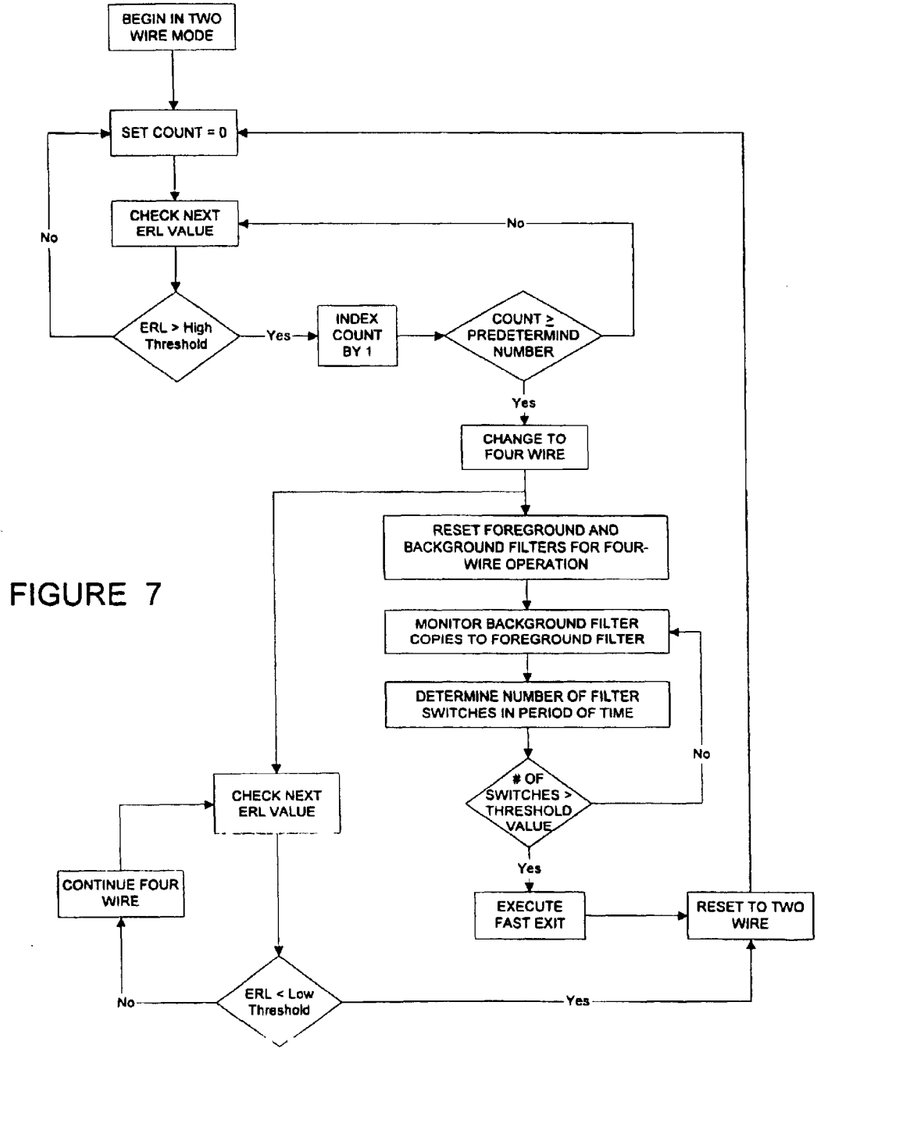
FIG. 7 is a logical block diagram illustrating the process for classification of a connection as two wire or four wire.

The process for classification of a connection as two wire or four wire is illustrated in FIG. 7. All signals will initially be classified as two wire. A signal can switch between two wire and four wire classification based upon changes in the ERL at any time during a communication link. As each ERL value is determined by the current period estimation unit 41, its value is checked against the high threshold. If the value is below the high threshold the next ERL value is assessed. If the value is above the high threshold, a counter is indexed and then the next value is assessed. If any next value of the ERL is below the high threshold, before the counter reaches a predetermined number of successive ERL values, the counter is reset to zero. If the number of successive ERL values above the high threshold exceeds the predetermined number of successive ERL values, before the counter is reset, than the signal will be classified as four wire.

Once the signal has been classified as four wire, it will be processed as four wire and will retain this classification until a four wire fast exit is initiated or the ERL value of the signal falls below a low threshold. The four wire fast exit is based upon a comparison of the foreground filter and the background filter and the frequency of copying of the background filter to the foreground filter. In four wire operation, the echo canceller filters are not used, however, the background filter performance is tracked. Typically, if there is no echo, the background filter will not converge and therefore its performance will not cause updates where the background filter is copied onto the foreground filter. When a hybrid appears, the background filter will converge and its performance will soon overtake the foreground filter causing a copy to occur. The frequency of updating is monitored and if the background filter is copied to the foreground a certain number of times in a certain period of time, indicative of hybrid activity, for example 3 switches in 80 ms, then four wire fast exit is executed. The communication link is reclassified as two wire and the counter is reset. The link can also be reclassified as two wire if the ERL falls below the low threshold.

The ERL can fall below the high threshold and remain classified as four wire. If the ERL falls below the low threshold, then the signal is classified as two wire and the count is reset to zero.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed is:

1. A method of selecting echo cancellation treatment in a communication link, comprising:

measuring a value of a signal received from a far end of a communication link;

measuring a corresponding value of a signal received from a near end of said communication link;

calculating a series of echo return loss estimates, for said measured values, as a ratio of said far-end value to said near-end value;

comparing each echo return loss estimate in said series to a threshold echo return loss estimate;

identifying the occurrence of an uninterrupted sequence of echo return loss estimates each exceeding said threshold value;

comparing the length of said sequence to a predetermined value; and selecting four wire echo cancellation treatment when said uninterrupted sequence exceeds said predetermined value.

2. The method of claim 1 further comprising:

monitoring the value of said echo return loss when said four wire echo cancellation treatment is selected; and selecting two wire treatment when said echo return loss value falls below a second lower threshold.

3. The method of claim 1 further comprising:

monitoring a background filter to foreground filter copy activity when said four wire echo cancellation treatment is selected;

determining the number of filter switches in a predetermined period of time;

comparing said number of switches to a threshold value; and executing a fast exit to select two wire treatment when said number exceeds said threshold value.

4. The method of claim 2 further comprising:

monitoring a background filter to foreground filter copy activity when said four wire echo cancellation treatment is selected;

determining the number of filter switches in a predetermined period of time;

comparing said number of switches to a threshold value; and executing a fast exit to select two wire treatment when said number exceeds said threshold value.

5. A method of detecting the presence of a hybrid in a communication link for a selected echo cancellation treatment, comprising:

periodically measuring a first signal originating at a first end of said communication link, at a second end of said communication link;

periodically measuring an echo of said first signal corresponding to a periodic measurement of said first signal, originating from said second end of said communication link;

comparing each periodic measurement of said first signal with each periodic measurement of said corresponding echo of said first signal to determine a series of echo return loss values;

comparing each of said echo return loss values to a first high threshold;

determining when a consecutive number of said echo return loss values is greater than a predetermined number and each of said consecutive number exceeds said first high threshold; and selecting a four wire echo cancellation treatment when said uninterrupted sequence exceeds said predetermined value.

6. The method of claim 5, further comprising:

after said consecutive number of said echo return loss values exceeding said first high threshold exceeds a predetermined value, comparing each of said echo return loss values to a second low threshold; and determining when a number consecutive of said echo return loss values is greater than predetermined number falls below said second threshold.

7. Apparatus for detection of a hybrid in a communication link and selecting a four wire echo cancellation mode, comprising:

a far end signal input;

a near end signal input;

an echo return loss measurement module for receiving said far end signal input and said near end signal input and for measuring the difference between said far end signal and its corresponding near end echo as an return loss;

an echo cancellation mode selector connected to said echo return loss measurement module, for comparing said echo return loss to a first high threshold and for counting the number of sequential occurrences of said echo return loss exceeding said first high threshold and for selecting said four wire echo cancellation mode when said number of sequential occurrences exceeds a predetermined value.

8. The apparatus of claim 7, wherein:

said echo cancellation mode selector also compares said echo return loss to a second low threshold and counts the number of sequential occurrences of said echo return loss falling below said second low threshold and selects another echo cancellation mode when said number of sequential occurrences exceeds a predetermined value.

9. The apparatus of claim 7, wherein said echo cancellation mode selector includes:

a foreground filter;

a background filter for updating said foreground filter;

a counter connected to said foreground filter and to said background filter for counting the number of updates to said foreground filter within a predetermined period of time; and a fast exit for selecting a second echo cancellation mode when said number of updates within a predetermined period of time exceeds a predetermined number of updates.

* * * * *